April 24, 1934.   F. G. HODSDON   1,955,810
TEAT CUP FOR MILKING MACHINES
Filed June 15, 1932    2 Sheets-Sheet 2
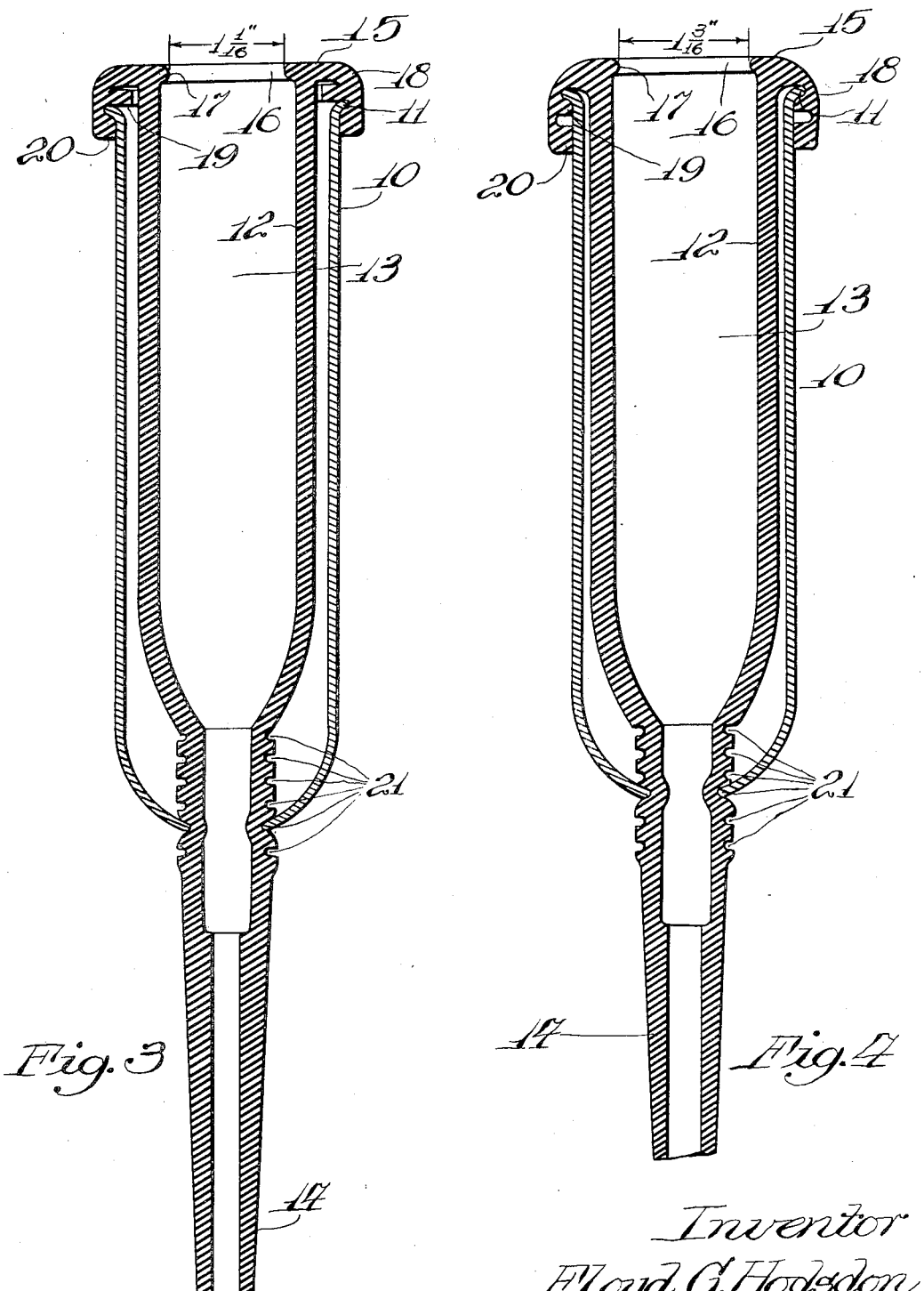

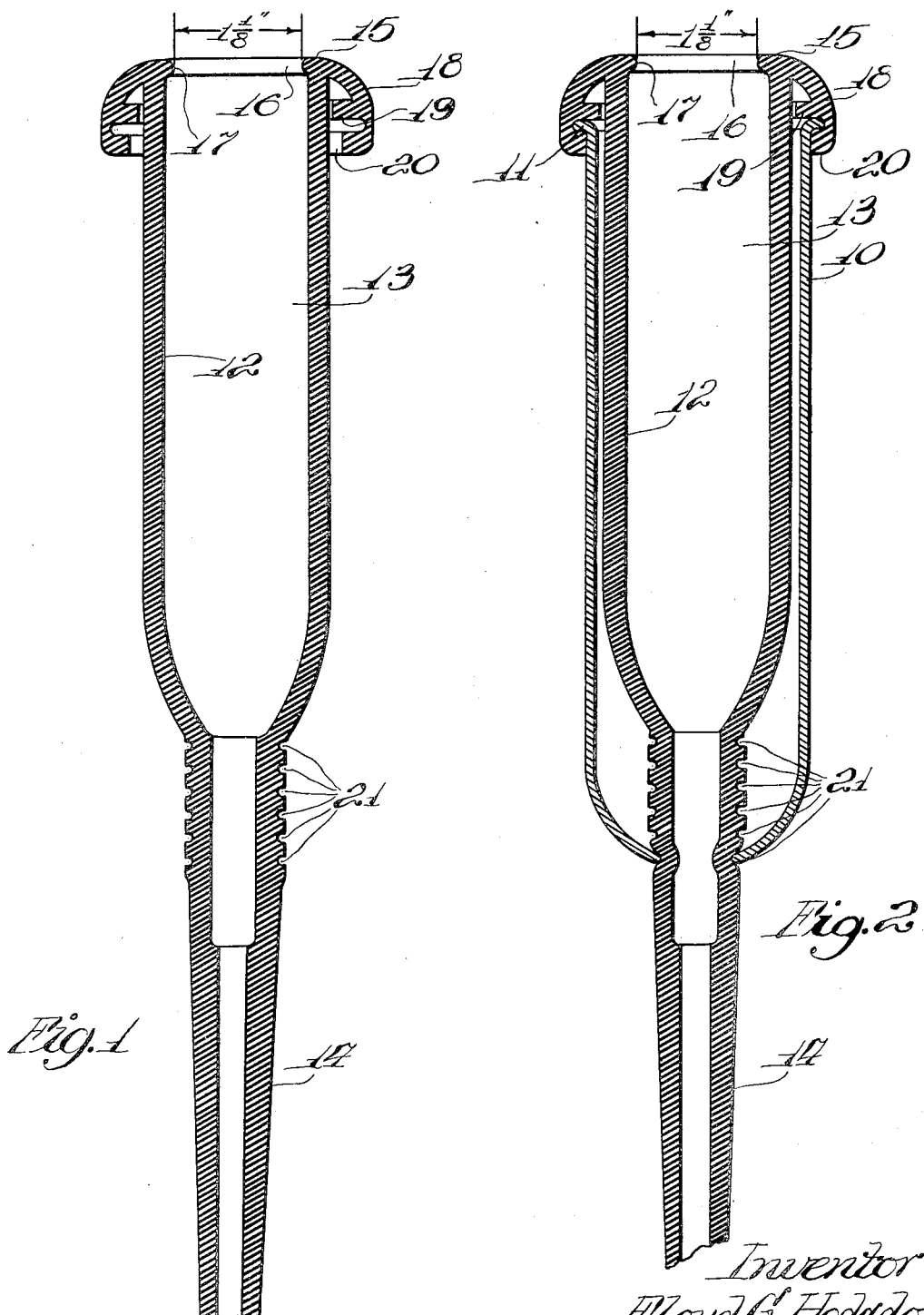

Patented Apr. 24, 1934

1,955,810

UNITED STATES PATENT OFFICE 1,955,810

TEAT CUP FOR MILKING MACHINES

Floyd G. Hodsdon, Milwaukee, Wis., assignor to International Harvester Company, a corporation of New Jersey Application June 15, 1932, Serial No. 617,288

6 Claims. (Cl. 31—85)

This invention relates to teat cup devices for mechanical milkers.

Such devices conventionally consist of a metallic tube known as the cup or shell, said part carrying detachably an insert or liner usually made of rubber. These liners when inserted in the cup or shell are open at their upper end to receive a cow's teat. Such liners and especially the opening mentioned are not now adjustable in size properly to fit teats of different size. Accordingly, it becomes necessary sometimes to have available for use liners in different sizes to meet all conditions encountered in practice. This is objectionable mainly in that it adds to costs.

Therefore, it is the principal object of this invention to provide a teat cup and liner constructed to permit quick and easy adjustment of the teat liner opening to any desired size likely to be needed, to the end that a liner of one size may be useful in meeting all requirements by means of a simple adjustment. This is highly important as it insures the proper fit and prevents accidental dropping off of teat cups and their consequent soiling and possible contamination in use.

This desirable object is achieved by the provision of a liner having a teat receiving portion and a tail portion, which latter portion may, upon elastic stretch or shortening of the liner, be adjustably set in the lower end of the cup to enlarge or make smaller the teat receiving opening of the liner, as may be desired.

In the accompanying sheets of drawings illustrating a practicable form of the invention:

Figure 1 is a vertical cross sectional view through the improved liner per se;

Figure 2 is a vertical cross sectional view through the assembled cup and liner with the latter set in adjusted position to provide a medium sized teat opening;

Figure 3 is a similar view showing a small opening; and,

Figure 4 is the same, showing a large opening.

The teat cup shell is made of tubular metal in the usual way and comprises a tube 10 open at its upper end and bounded at its upper edge with an outturned flange 11, while its lower end is turned in, cup-fashion, but leaving an opening through which the tail portion of the liner, to be described, is passed.

The liner is generally shown at 12, the same comprising in a tubular unitary piece of rubber or the like, a teat receiving body portion 13, a tail 14, and a head 15, the latter being open at 16 to permit insertion of a teat, and surrounded by a small, inwardly extended bead 17.

As best shown in Figure 1, the head portion is formed outwardly and downwardly, as at 18, to provide two spaced flanges extending inwardly, there being an upper horizontal flange at 19, and a similar lower flange at 20. This provides two annular spaces, each of which is adapted to be snapped over the flange 11 of the shell to assemble the shell and liner together. Just below the point where the liner body 13 merges with the tail 14, a portion of the tail is provided on its exterior surface with a series of spaced, annular grooves 21, any selected one of which is adapted to detachably receive the lower end of the shell 10 for connecting the tail to the lower end of the cup in the manner shown. The manner of adjustably determining or fixing the size of the teat receiving liner opening 16 will now be described.

The liner is assembled with the shell by inserting the same, tail first, into the cup shell 10 until the tail 14 projects through the lower end of the shell. If it is desired to make the entrance hole 16 relatively small, then the next to the lowest groove 21 in the tail will be snapped into the lower end of the shell and the annular space immediately above the horizontal flange 20 will be snapped over the upper edge 11 of the shell to connect the head of the liner in place, as best shown in Figure 3 where it is found the entrance opening has thus been adjusted to a diameter of $1\frac{1}{16}$ inches, because of the stretch imparted in a lengthwise direction to the liner, said stretch being maintained by the two lock points, one in the head, and one in the tail of the liner. In other words, with the head of the liner locked in the groove immediately above the flange 20, the more elongation imparted to the body 12 of the liner by drawing the tail 14 downwardly through the shell, the smaller becomes the opening 16, as elongation of the liner under such condition draws the head of the liner together to make said hole 16 smaller. Release of such elongation conversely enlarges said opening.

The standard size of liner opening is $1\frac{1}{8}$ inches, as shown in Figure 2, and this is achieved by causing the lowermost groove 21 to engage and lock with the lower end of the cup shell, the upper lock point remaining between flange 11 and the space immediately above the flange 20 in the head.

If, for example, a relatively large opening 16 is required, then, as shown in Figure 4, the annular space immediately above the flange 19 in the head of the liner is snapped over the flange 11 of the shell, and the tail 14 is not pulled down so far, the lower lock of the liner to the bottom end of the shell being at an intermediate or upper groove 21. As shown in Figure 4, the opening 16 will have a diameter of $1\frac{3}{16}$ inches.

From this disclosure it now is apparent that an improved liner has been provided, capable of adjustment in a simple manner, to meet all conditions likely to be encountered in milking machine practice.

It is the intention to cover herein all changes and modifications of the example herein shown which do not depart from the spirit and scope of the invention defined in the appended claims.

What is claimed is:

1. In a teat cup, a hollow elongated shell, an elastic liner insertable therein and having a head portion formed with a plurality of internal grooves any one of which may be connected to the upper end of the shell, said liner having a tail portion provided with a plurality of external grooves for detachable connection to the lower end of the shell, said upper and lower connecting means providing a plurality of points of connection for the liner to the shell to make the entrance to the liner adjustable in size.

2. In a teat cup, a shell, and a liner insertable therein, said liner having a head provided with a plurality of internal grooves selectively connectible with the upper edge of the shell for adjusting the size of the liner entrance opening.

3. In a teat cup, an elongated shell, an elastic liner, means for connecting a portion of the liner to one end of the shell at any one of a plurality of points of connection, and means for connecting another portion of the liner to the other end of the shell at any one of a plurality of points of connection.

4. In a teat cup, an elongated shell, an elastic liner located within the shell and having a head portion provided with a plurality of internal spaced grooves for connection to the upper end of the shell, and said liner embodying a tail portion provided with a plurality of spaced external grooves for connection to the lower end of the shell.

5. In a teat cup, an elongated shell, and an elastic liner located within and connected to the shell, said liner having a head portion provided with an outwardly and downwardly extending shoulder having a plurality of inturned flanges to provide several spaced grooves any one of which serves as a point of connection for the head of the liner to the upper end of the shell, said liner also having a tail portion provided with a plurality of spaced grooves any of which serves as a point of connection for the tail portion to the lower end of the shell.

6. In a teat cup, an elongated shell, an elastic liner mounted therein and having an entrance opening, said liner being elastically alterable in length relative to the shell to predetermine the size of its entrance opening, and a plurality of lock means at each end of the liner to connect the liner to the shell adjustably at its opposite ends to maintain the predetermined size of said opening.

FLOYD G. HODSDON.